(12) United States Patent
Bernard (10) Patent No.: US 7,937,886 B2
(45) Date of Patent: May 10, 2011

(54) SPILL RESISTANT INSECT BAIT STATION

(76) Inventor: Alan Bernard, Boca Raton, FL (US)

( * ) Notice: Subject to any disclaimer, the term of this patent is extended or adjusted under 35 U.S.C. 154(b) by 0 days.

(21) Appl. No.: 12/146,543

(22) Filed: Jun. 26, 2008

(65) Prior Publication Data

US 2008/0307695 A1    Dec. 18, 2008

Related U.S. Application Data

(63) Continuation-in-part of application No. 12/004,691, filed on Dec. 21, 2007, now abandoned, which is a continuation-in-part of application No. 11/093,200, filed on Mar. 29, 2005, now Pat. No. 7,310,908, which is a continuation-in-part of application No. 10/679,828, filed on Oct. 6, 2003, now Pat. No. 6,871,444.

(51) Int. Cl.
*A01M 1/02* (2006.01)
*A01M 1/20* (2006.01)

(52) U.S. Cl. ............................................. 43/131; 43/121

(58) Field of Classification Search .................... 43/131, 43/121
See application file for complete search history.

(56) References Cited

U.S. PATENT DOCUMENTS

| | | | | |
|---|---|---|---|---|
| 29,468 A | * | 8/1860 | Cottingham et al. | 43/121 |
| 71,346 A | * | 11/1867 | Weaver | 43/121 |
| 352,289 A | * | 11/1886 | Barnes et al. | 43/121 |
| 501,350 A | * | 7/1893 | Kuntz | 43/121 |
| 1,748,449 A | * | 2/1930 | Hughett | 43/131 |
| 1,815,595 A | * | 7/1931 | Simpson | 43/131 |
| 1,887,771 A | * | 11/1932 | Marsh | 43/131 |
| 1,892,952 A | * | 1/1933 | Hyman | 43/121 |
| 1,960,464 A | * | 5/1934 | Thalheimer | 43/131 |
| 1,996,969 A | * | 4/1935 | Mocaer | 43/121 |
| 3,108,391 A | * | 10/1963 | Sipos | 43/113 |
| 3,303,600 A | * | 2/1967 | Freeman | 43/131 |
| 4,152,862 A | * | 5/1979 | Mohiuddin | 43/121 |
| 4,208,829 A | * | 6/1980 | Manning | 43/131 |
| 4,277,907 A | * | 7/1981 | Ernest | 43/131 |
| 4,552,307 A | * | 11/1985 | Stedham | 239/57 |
| 4,566,218 A | * | 1/1986 | Kurosawa et al. | 43/58 |
| 4,648,201 A | | 3/1987 | Sherman | |
| 4,782,621 A | | 11/1988 | Wissman | |
| 4,793,093 A | | 12/1988 | Gentile | |
| 4,823,506 A | | 4/1989 | Demarest et al. | |
| 4,841,669 A | | 6/1989 | Demarest et al. | |
| 5,048,225 A | * | 9/1991 | Brandli | 43/131 |
| 5,446,992 A | | 9/1995 | Stewart | |
| 5,501,033 A | | 3/1996 | Wefler | |

(Continued)

*Primary Examiner* — David J Parsley
(74) *Attorney, Agent, or Firm* — Mark D. Bowen, Esq.; Malin Haley DiMaggio Bowen & Lhota, P.A.

(57) ABSTRACT

A spill resistant insect bait station designed for secure anchorage to the ground is disclosed as having a generally hollow main body defining an internal reservoir for containing a flowable, preferably liquid, bait contained therein. The main body is preferably fabricated from plastic via a blow molding process that includes the steps of filling and sealing. By removing a seal, an access opening is provided at ground level in proximity to the base and an access tunnel guides insects to an opening at the top of the bait station. At top opening on the opposite side of the bait station relative to the access opening allows insect access to the internal reservoir while rending the bait station inherently spill resistant. The inner wall of the main body includes a spiral ramp leading downward to provide insects with access to liquid bait contained therein.

3 Claims, 9 Drawing Sheets

U.S. PATENT DOCUMENTS

| | | | |
|---|---|---|---|
| 5,622,001 A * | 4/1997 | Kazmierzak | 43/121 |
| 5,775,026 A | 7/1998 | Pearce et al. | |
| 5,802,761 A | 9/1998 | Demarest et al. | |
| 5,873,193 A * | 2/1999 | Jensen | 43/131 |
| 5,875,586 A | 3/1999 | Ballard et al. | |
| 5,918,410 A * | 7/1999 | Knuppel | 43/131 |
| 5,943,816 A | 8/1999 | Hyatt et al. | |
| 5,943,817 A | 8/1999 | Miller | |
| 5,953,854 A | 9/1999 | Hyatt | |
| 5,983,558 A | 11/1999 | Las et al. | |
| 6,041,542 A | 3/2000 | Payton et al. | |
| 6,189,259 B1 | 2/2001 | Soller | |
| 6,195,933 B1 | 3/2001 | Woodruff | |
| 6,216,384 B1 | 4/2001 | Dickson et al. | |
| 6,532,696 B2 | 3/2003 | Clark, III et al. | |
| 2005/0072039 A1 * | 4/2005 | Wong | 43/121 |

* cited by examiner

SPILL RESISTANT INSECT BAIT STATION

CROSS REFERENCE TO RELATED APPLICATIONS

This application is a Continuation-h-Part of U.S. patent application Ser. No. 12/004,691, filed on Dec. 21, 2007 now abandoned, which is a Continuation-In-Part of U.S. patent application Ser. No. 11/093,200, filed on Mar. 29, 2005, now U.S. Pat. No. 7,310,908, which is a Continuation-In-Part of U.S. patent application Ser. No. 10/679,828, filed Oct. 6, 2003, now U.S. Pat. No. 6,871,444, each of which are incorporated herein by reference.

STATEMENT REGARDING FEDERALLY SPONSORED RESEARCH OR DEVELOPMENT

Not Applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights.

BACKGROUND OF THE INVENTION

1. Field of the Invention

The present invention relates to devices for use in exterminating pests, and more particularly to a spill resistant insect bait station that holds a liquid, gel, or granular pest control substance, such as an insecticide or pesticide. In a primary embodiment, a spill resistant blow molded modular bait station is disclosed for fabrication by a process including the steps of molding, filling, and sealing the bait station. In an alternate embodiment, a re-fillable embodiment is disclosed.

2. Description of the Background Art

Human populations have long encountered problems co-existing with various insects, particularly ants. There are more than ten thousand species of ants, a number of which infest structures, lawns, parks, and other areas frequented by humans, as well as agriculture and crops. The various species of ants vary widely in many respects including size, color, shape, distribution, food preference, and nest locations. Many other species of ants routinely disrupt activities in homes, offices, parks, and protect homopteran pests that can impact agriculture crops and ornamental plantings. As a result, controlling insect populations is therefore necessary.

A primary means of pest control involves the use of toxicants, particularly liquid poison. The spraying of liquid poison is a common method of pest control. Spraying liquid poison, however, involves a number of inherent disadvantages. A primary disadvantage involves the risk of exposing humans to the toxic chemical formulations. Furthermore, spraying poison is often harmful to the environment and often causes damage to vegetation and other animal species in addition to the targeted pest population. In addition, liquid poison that has been applied by spraying often degrades over time and/or is washed away by rain or irrigation water thereby reducing effectiveness and requiring repeated treatment and/or the use of greater quantities. Toxicants can also leach into the soil and end up contaminating the ground water.

For these and other reasons it has been found preferable to contain liquid or gel toxicants in bait stations, which stations provide structures that contain the poison while providing access to insects. The background art reveals a number of attempts directed to pest control. The following patents provide examples of these attempts.

| | | | |
|---|---|---|---|
| 4,648,201 | Sherman | 5,875,586 | Ballard et al. |
| 4,782,621 | Wissman | 5,943,816 | Hyatt et al. |
| 4,793,093 | Gentile | 5,943,817 | Miller |
| 4,823,506 | Demarest et al. | 5,953,854 | Hyatt |
| 4,841,669 | Demarest et al. | 5,983,558 | Las et al. |
| 5,446,992 | Stewart | 6,041,542 | Payton et al. |
| 5,501,033 | Wefler | 6,189,259 | Soller |
| 5,775,026 | Pearce et al. | 6,195,933 | Woodruff |
| 5,802,761 | Demarest et al. | 6,216,384 | Dickson et al. |
| | | 6,532,696 | Clark III, et al. |

U.S. Pat. No. 4,793,093, issued to Gentile, discloses a feeding station for vermin that allows for ingress of the vermin to feed on poisoned bait held at a central portion therein. The bait is contained within a central well and ingress is facilitated by an inclined ramp leading to the chamber. A cover is joined to the top of the base member to cover the central well holding the poisoned bait.

U.S. Pat. Nos. 4,823,506 and 4,841,669, issued to Demarest et al., each disclose an insect bait device for exterminating crawling insects. The devices comprise first and second housing portions joinable to form a housing that defines generally unobstructed entry into the device by an insect. U.S. Pat. No. 5,802,761, also issued to Demarest et al., discloses a bait station including a base defining a bait-cup and a cover fastened to the base. The cover and base cooperate to form a door and walkway to admit targeted insects to enter the bait station thus gaining access to the bait cup.

U.S. Pat. No. 5,501,033, issued to Wefler, discloses a liquid delivery bait station having two reservoirs and fluid transfer systems to allow sequential delivery of two liquids. The liquids are preferably an insect attractant that is first delivered into an absorbent feeding pad and an insect toxicant that is next delivered to the absorbent pad.

U.S. Pat. No. 5,775,026, issued to Pearce et al., discloses an insect bait station for attracting and killing insects that comprises a substantially flat configuration with insecticide formulated as a solid coating on the surface of a sheet of moisture free material, and one or more breakable ampoules containing an attractant composition. The ampoules are held in a compressible portion of the housing permitting them to be manually broken to discharge their contents on command thereby releasing attractant vapors.

U.S. Pat. No. 5,875,586, issued to Ballard et al., discloses a refillable liquid bait station formed to allow access by insects, but not by larger animals. The bait station includes a transparent housing that protects the liquid bait from wind and rain and which further prevents leakage if the bait station is tumbled and/or placed in an incorrect position by use of a series of inner walls and chambers.

U.S. Pat. No. 5,943,816, issued to Hyatt et al., discloses an insect bait station for delivering a liquid toxicant. The bait station includes a reservoir, a feeding disk with capillary feeding pores, and a base that seals the feeding pores when configured in a closed position. U.S. Pat. No. 5,953,854, also issued to Hyatt, discloses a spill resistant granular bait station having a tunnel entrance leading to an interior bridged member having an inner wall leading from the bottom surface to an inner surface having an access opening in the bridge member leading to a bait source contained within the station. A cover defines a recessed portion thereon closely cooperating with the access opening in the base.

U.S. Pat. No. 6,041,542, issued to Payton et al., discloses a spill-resistant liquid bait station for dispensing liquid bait. The liquid bait is contained in a reservoir at the bottom of the bait station base and a lid is secured over the end of the base. The interior of the bait station is configured for containing the liquid bait if the bait station is inverted. Insects enter the bait station through one or more access ports and then travel through an interior passageway to the liquid bait.

U.S. Pat. No. 6,189,259, issued to Soller, discloses an insect bait-and-switch liquid delivery apparatus for the control of insects. The apparatus includes a reservoir defining a first chamber containing a liquid attractant and a second chamber containing a liquid toxicant. A first feeding station is provided in the first chamber and a second feeding station is provided in the second chamber. A passageway connects the first and second chambers, and an access port is disposed to initially prevent or limit access of an insect to the second feeding station during an initial feeding period and the subsequently enable access to the second feeding station via the passageway after the initial feeding period.

U.S. Pat. No. 6,195,933, issued to Woodruff, discloses a bait station for delivery of liquid insecticide formed from a base having at least one feeding station and a reservoir for storing liquid beneath the base. The insecticide is transferred by capillary action from the reservoir to the feeding station via a connecting tube.

U.S. Pat. No. 6,216,384, issued to Dickson et al., discloses an insect bait station having a continuous outer wall leading from a base to an upper annular surface having a central axial recessed opening therein leading down to a bait source contained in the interior of the station. The interior of the station defines an inverted conical concave part for concentrating the bait to the lowest point of the cone in proximity with an opening in the bottom of the central axial recessed opening.

U.S. Pat. No. 6,532,696, issued to Clark III, et al., discloses a holder for liquid insect bait comprising a sealed container having a bottom portion defining contours that form reservoirs and channels wherein liquid bait may be located and flow. The device is deployed by orienting the device in a vertical configuration whereby the liquid bait flows to specified internal reservoirs, cutting an entrance opening in the container at a specified location, and placing the container in a horizontal configuration wherein the liquid bait flows to additional reservoirs accessible to the insects.

The present inventor has contributed significant advancements in the art of insecticide delivery using insect bait stations. In U.S. Pat. No. 6,871,444, the present inventor discloses a user activated, disposable insect bait station particularly adapted for use with liquid bait, including attractants and toxicants. The bait station is formed as a sealed container fabricated from two primary parts, an upper half and a lower half sealingly connected along common peripheral edges. The bait station includes first and second internal chambers. The first internal chamber contains a liquid bait reservoir wherein all of the liquid bait is stored prior to use, and the second internal chamber is adapted to function as an entrance providing insects access to the second chamber. Manual manipulation of the bait station is required for activation whereby a frangible seal is broken placing the first and second chambers in fluid communication thereby allowing liquid bait to flow into the second chamber. Further advancements relating to the bait station are disclosed in U.S. Pat. No. 7,310,908 in the name of the present inventor.

While the insect bait stations disclosed in the art are generally suitable for the purposes for which they are intended, there exists a need for an improved spill resistant insect bait station designed for secure anchorage to the ground.

BRIEF SUMMARY OF THE INVENTION

The present invention provides, in a first embodiment, a spill resistant insect bait station designed for secure anchorage to the ground. In a preferred embodiment, the bait station comprises a generally hollow main body defining an internal reservoir for containing a flowable, preferably liquid, bait contained therein. The main body is preferably fabricated from plastic via a blow molding process that includes the steps of filling and sealing. A ground anchor projects from the base of the main body that facilitates anchoring the bait station to the ground. By removing a seal, an access opening is provided at ground level in proximity to the base and an access tunnel guides insects to an opening at the top of the bait station. Placing the top opening on the opposite side of the bait station relative to the access opening renders the bait station spill resistant. The inner wall of the main body includes a spiral ramp leading downward to provide insects with a means of accessing liquid bait contained therein. Providing such a ramp structure maximizes access to the bait regardless of the fill level. The bait station is preferably fabricated from a manufacturing process wherein the bait station is formed by blow molding, and automatically filled with suitable bait, such as a combination attractant and toxicant, and sealed. In an alternate embodiment, a blow molded, user-fillable bait station is provided. In accordance with the alternate embodiment, a blow molded bait station body comprises a main body portion having a top with a fill port. Either embodiment is deployed by simply removing the seal and anchoring the bait station to the ground.

Accordingly, it is an object of the present invention to provide a spill resistant insect bait station.

Still another object of the present invention is to provide an insect bait station specifically adapted to be anchored to the ground when deployed.

Still further objects and advantages will become apparent from a consideration of the ensuing description and drawings.

DETAILED DESCRIPTION OF THE INVENTION

With reference to the drawings, FIGS. 1-8 depict a spill resistant insect bait station, generally referenced as 10, in accordance with a preferred embodiment of the present invention. Bait station 10 comprises a spill resistant insect bait station designed for secure anchorage to the ground. Bait station 10 includes a generally hollow main body 12 defining an internal reservoir for containing a flowable, preferably liquid, bait contained therein. Main body 12 includes a top portion 14 and a bottom portion 16. Main body 12 comprises a generally hollow body that functions as a bait reservoir for containing insect bait, such as a liquid combination of attractant and toxicant. Insect bait station 10 is preferably fabricated from plastic-type material using blow molding fabrication techniques, and particularly fabrication techniques that include molding, filling, and sealing. In a preferred embodiment, bait station 10 is pre-filled to a level within main body 12 that is approximately one-half of the total volume defined by main body 12 between top and bottom portions 14 and 16. Over time, it is expected that the actual fill level will decreased from the initial fill level due to evaporation. Evaporative loss, however, is minimized by having an insect tunnel 20 with an atmospheric exposed opening, namely inlet 22, disposed in a remote location relative to the interior bait reservoir defined by main body 12.

Figure 1:
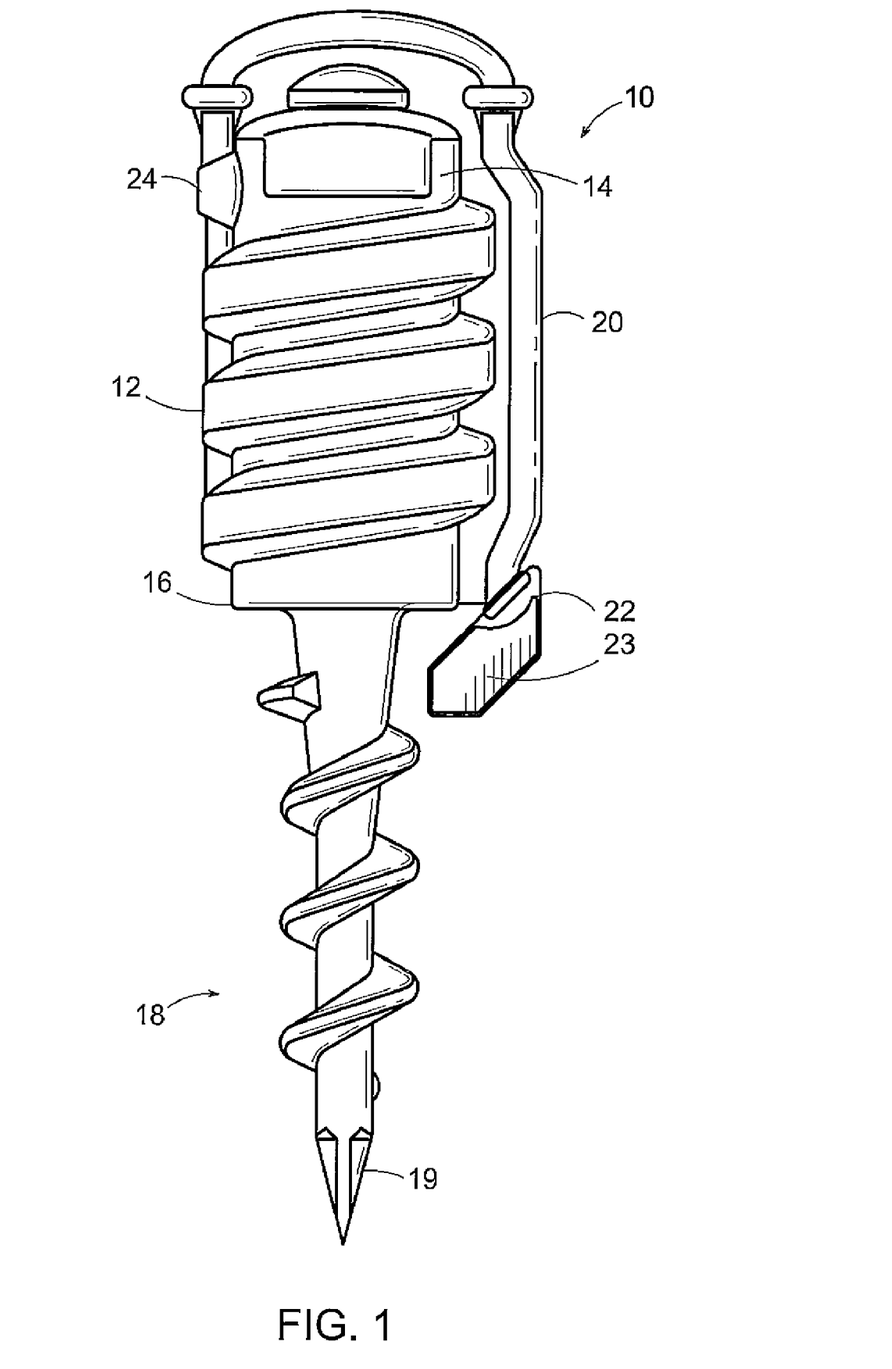
FIG. 1 is a front view of a pre-filled insect bait station in accordance with the present invention.
Figure 2:
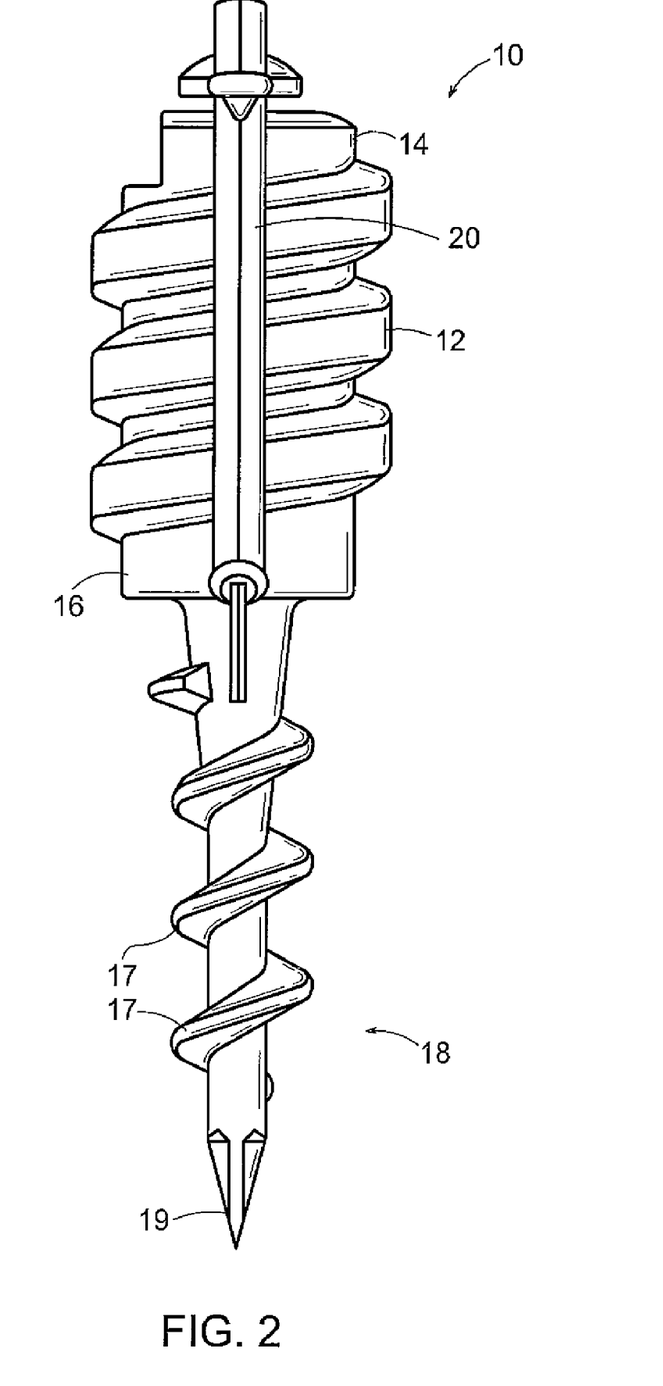
FIG. 2 is a right side view thereof.
Figure 3:
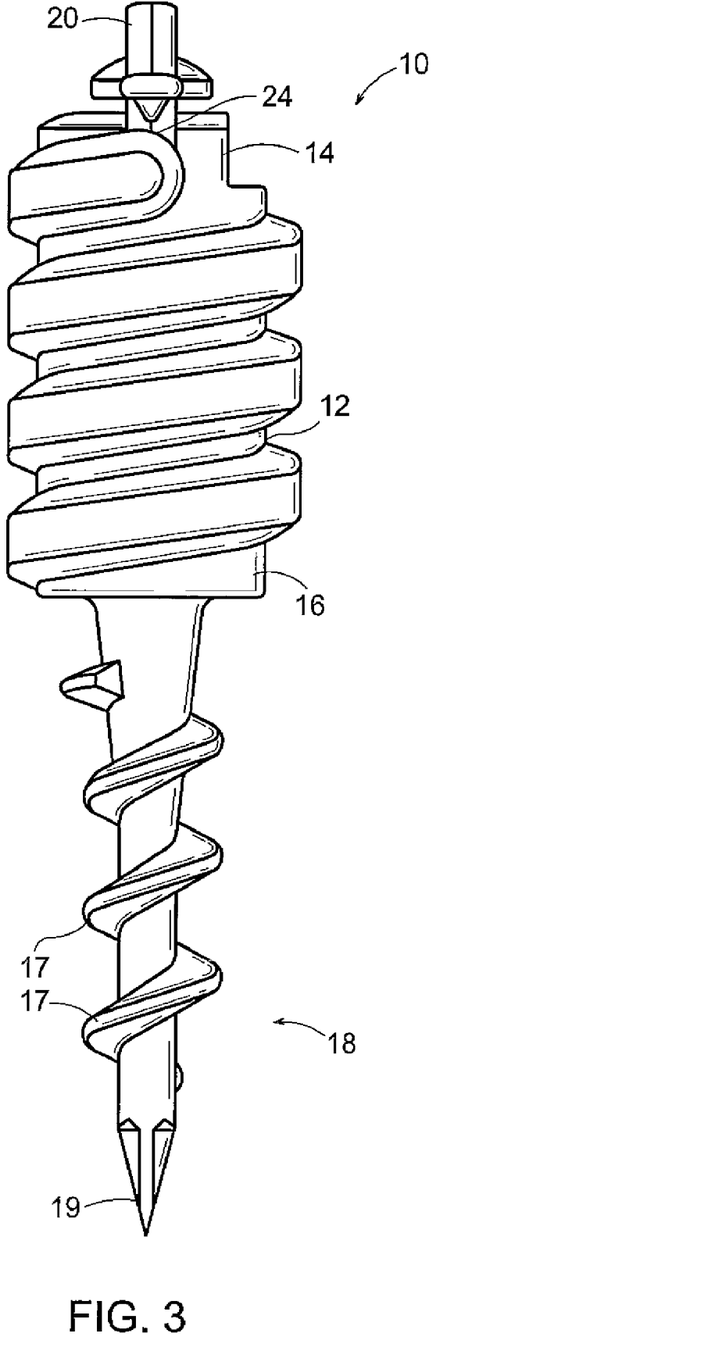
FIG. 3 is a left side view thereof.
Figure 4:
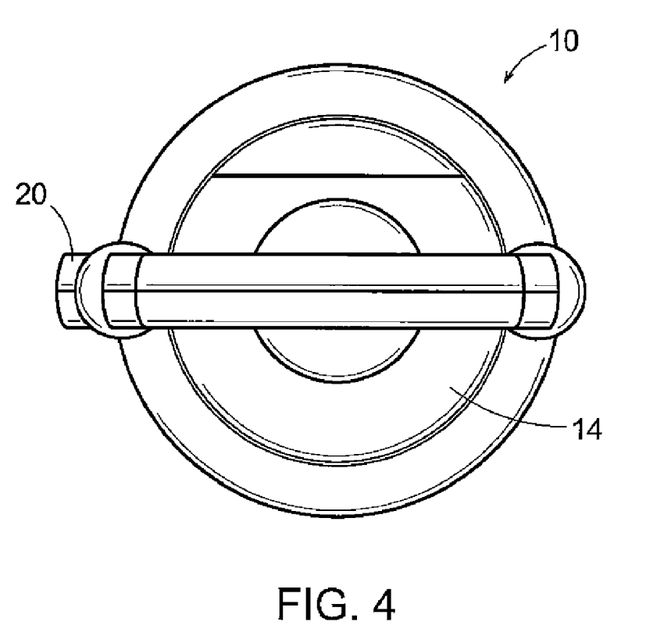
FIG. 4 is a top view thereof.
Figure 5:
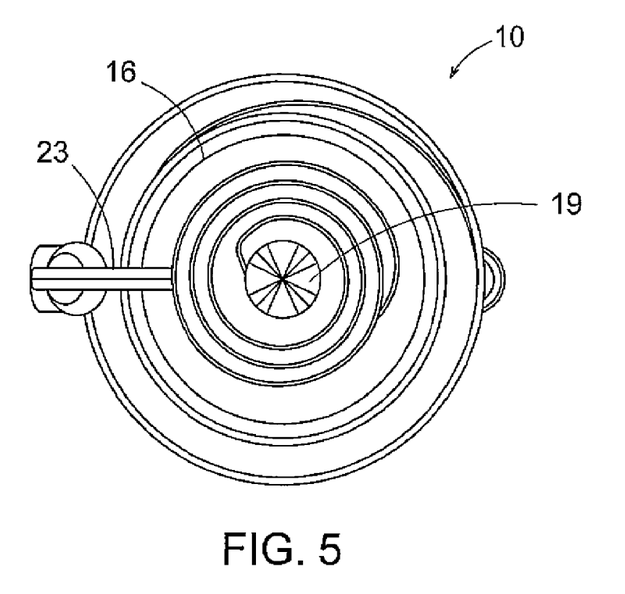
FIG. 5 is a bottom view thereof.
Figure 6:
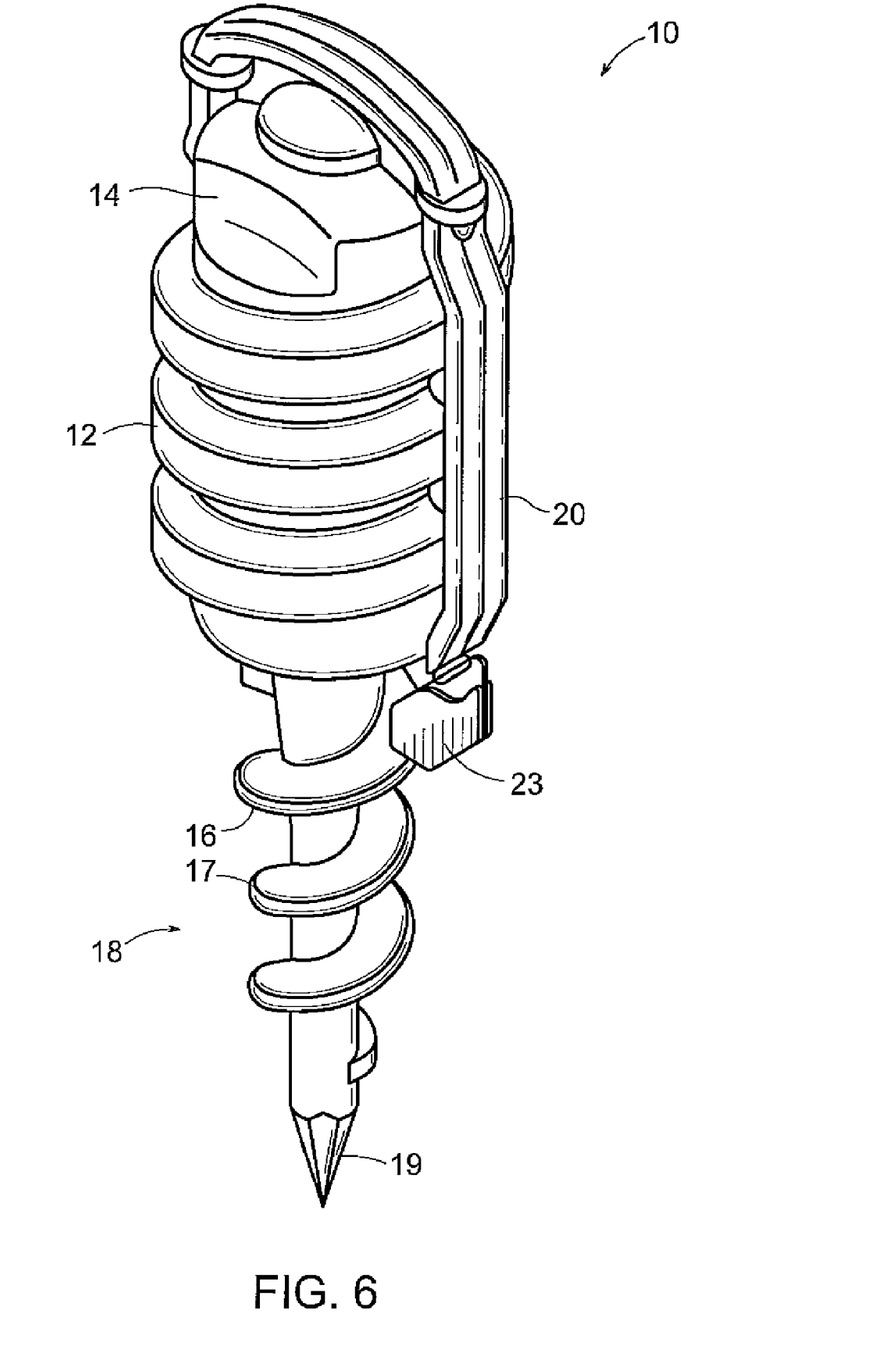
FIG. 6 is a top perspective view thereof.
Figure 7:
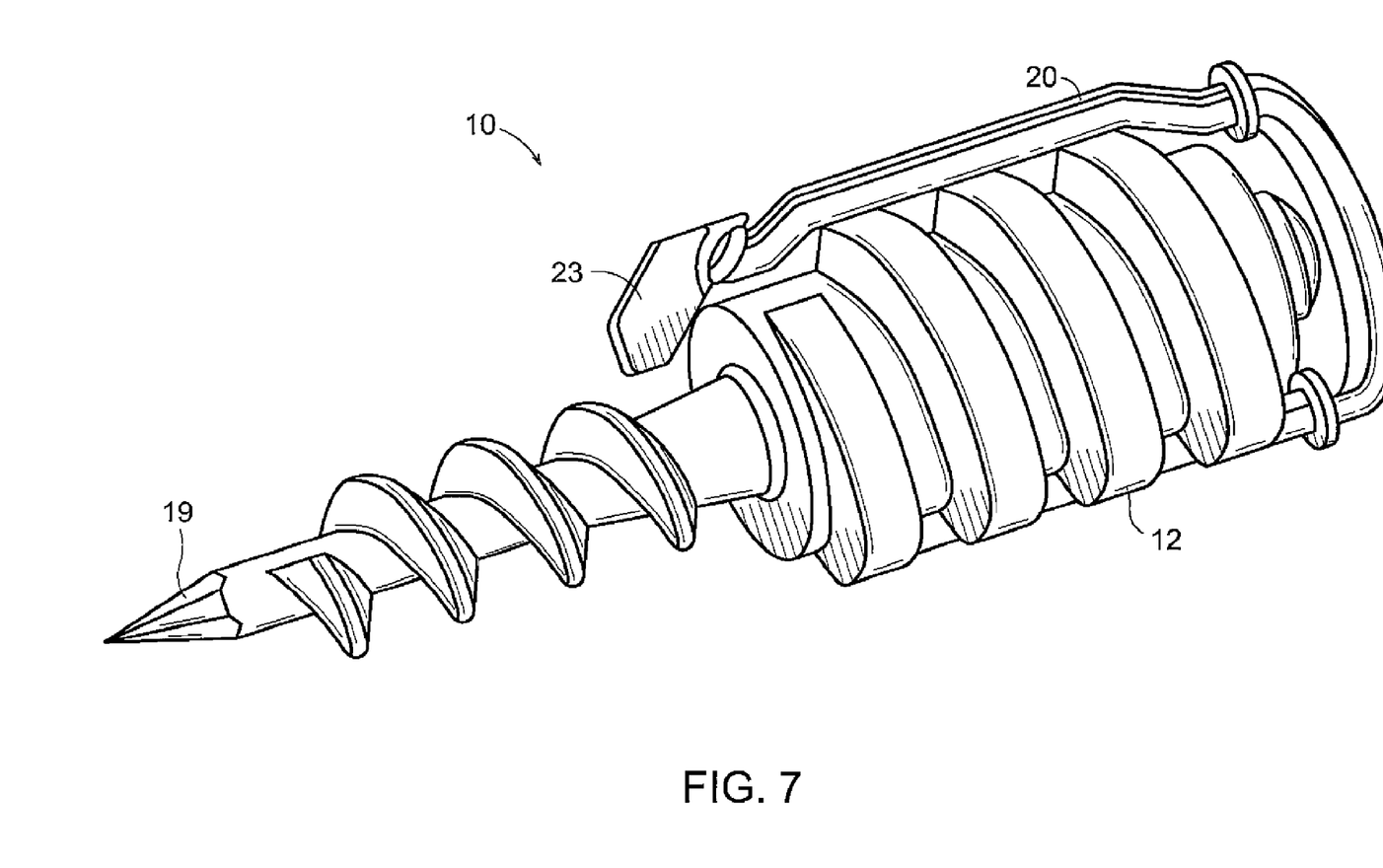
FIG. 7 is a bottom perspective view thereof.
Figure 8:
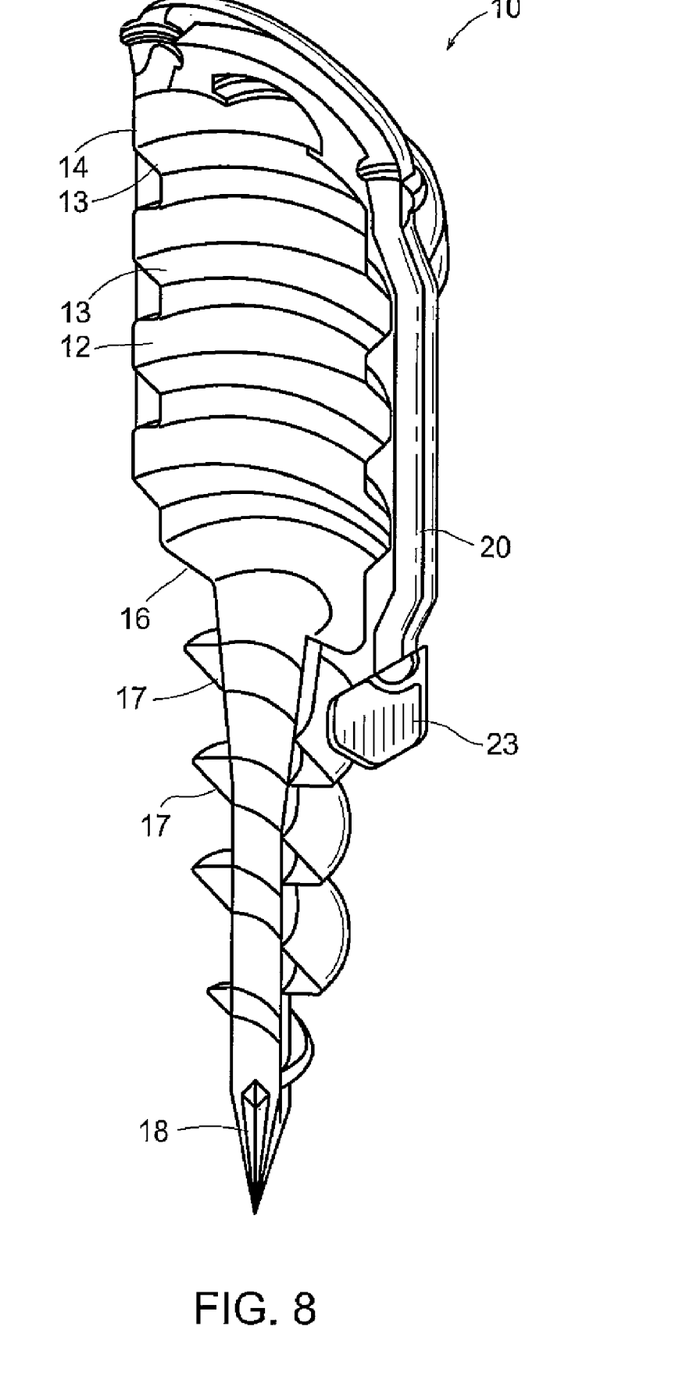
FIG. 8 is a top sectional perspective view thereof.

A significant aspect of the present invention is to provide an insect bait station that is spill resistant. Accordingly, insect bait station 10 is adapted with a tubular insect guide, generally referenced as 20, that provides insects with access to the flowable bait contained within main body 12. Insect guide 20 includes an inlet opening 22 comprising an insect access entrance disposed on a first side of main body 12 in proximity to base 16, and an outlet 24 comprising an insect outlet disposed on a second side of main body 12 and opening coextensively with an opening in the top 14 of main body 12 so as to be in direct communication with the bait station interior. First opening 22 preferably includes a removable (e.g. twist off) cap 23 that is removed by the user upon deployment. Outlet 24 is in communication with the interior of main body 12 of bait station 10. Accordingly, insects passing through guide 20 and out from outlet 24 are inside main body 12. A more fully discussed below, the inner surface of main body 12 defies a spiral ramp as shown in FIG. 8 that allows the insects to traverse downward to reach the bait regardless of fill level. Placement of the inlet opening 22 of insect guide 20 in proximity to the base 16 on a first side of the bait station, with the guide outlet 24 in proximity to the top 14 on an opposing second side of the bait station functions to render the bait station inherently spill resistant. For example, virtually no bait would spill were one to completely invert bait station 10 as the inlet 22 of insect guide 20 would be disposed above the inverted liquid fill level. In addition, should bait station 10 tip over and become generally horizontally disposed the flowable bait would be contained below the outlet 24 of insect tunnel 20 and thus be prevented from flowing from the bait station via opening 22. Should the bait station rotate on its side outlet 24 will either move upward or downward in inverse relation with inlet 22. Thus, should a bait station disposed in a horizontal configuration rotate about a horizontal axis in one direction, outlet 24 will become disposed at a lower elevation than inlet 22 such that bait is unable to flow out of inlet 22. Conversely, should a bait station disposed in a horizontal configuration rotate about a horizontal axis in second direction, outlet 24 will become disposed at a higher elevation than inlet 22 such that bait is unable to flow out of inlet 22. As a result, the insect tunnel structure of the present invention having top and bottom disposed openings positioned on opposing sides of the bait station main body reservoir function to provide an insect station capable of holding substantial quantities of flowable bait within a generally spill-proof structure.

A further significant aspect of the present invention involves adapting the inner wall of main body 12 with a ramp structure, referenced as 13 as best depicted in the sectional view shown in FIG. 8, for providing insects with a traversable surface leading directly to liquid bait contained within bait station 10. Since insects enter the interior of main body 12 at the top portion 14 upon exiting the outlet 24 of insect guide 20 the provision of an interior spiral ramp 13 provides the insects with a guide and path downward to the flowable bait, regardless of the fill level. Accordingly, spiral ramp 13 preferably extends downward along the inner wall of main body 12 from top portion 14, preferably originating in proximity to guide tube outlet 24, to bottom portion 16, or substantially the entire length of main body 12 thereby insuring that insects may reach the bait contained therein regardless of the fill level. A further significant aspect relating to the provision of a ramp structure relates to providing insects that have recently been exposed to the bait toxicant a means of egress out and away from the bait station. This is considered significant since a dying insect give off a chemical signature that has been found to warn other insects to stay away. Accordingly, providing insects a simple and effective means of egress functions to lengthen the effective life of the bait station.

Insect bait station 10 further includes a ground anchor 18 projecting from base 14 of main body 12 to facilitate anchoring the bait station to the ground. In a preferred embodiment, ground anchor 18 comprises an elongate projecting spike terminating in a pointed end 19, and having projecting threads 17 radially projecting therefrom. As should be apparent, ground anchor 18 functions to allow the user to securely anchor bait station 10 to the earth by rotating the bait station such that threads 17 function to draw the bait station into the ground. In an alternate embodiment ground anchor 18 may comprise a simple or complex spike, or other suitable ground anchor structure.

Bait station 10 is deployed for use by removing a seal 23 and screwing bait station 10 into the ground until bottom portion 16, and more particularly, inlet opening 22 of insect guide 20 is generally disposed at ground level. Attracted by the attractant component of the bait contained within bait station 10, insects enter the ground level inlet opening 22 and make their way through insect guide 20 to terminus at outlet 24 coextensive with an opening at the top portion 14 of main body 12. Once inside bait station 10, the insects are able to traverse spiral ramp 13 down to the bait level whereby the insects are exposed to the toxicant portion of the bait. As noted above, ramp structure 13 further provides insects that have recently been exposed to the bait toxicant a means of egress out and away from the bait station, thereby preventing insects from falling into or drowning in the bait.

Figure 9:
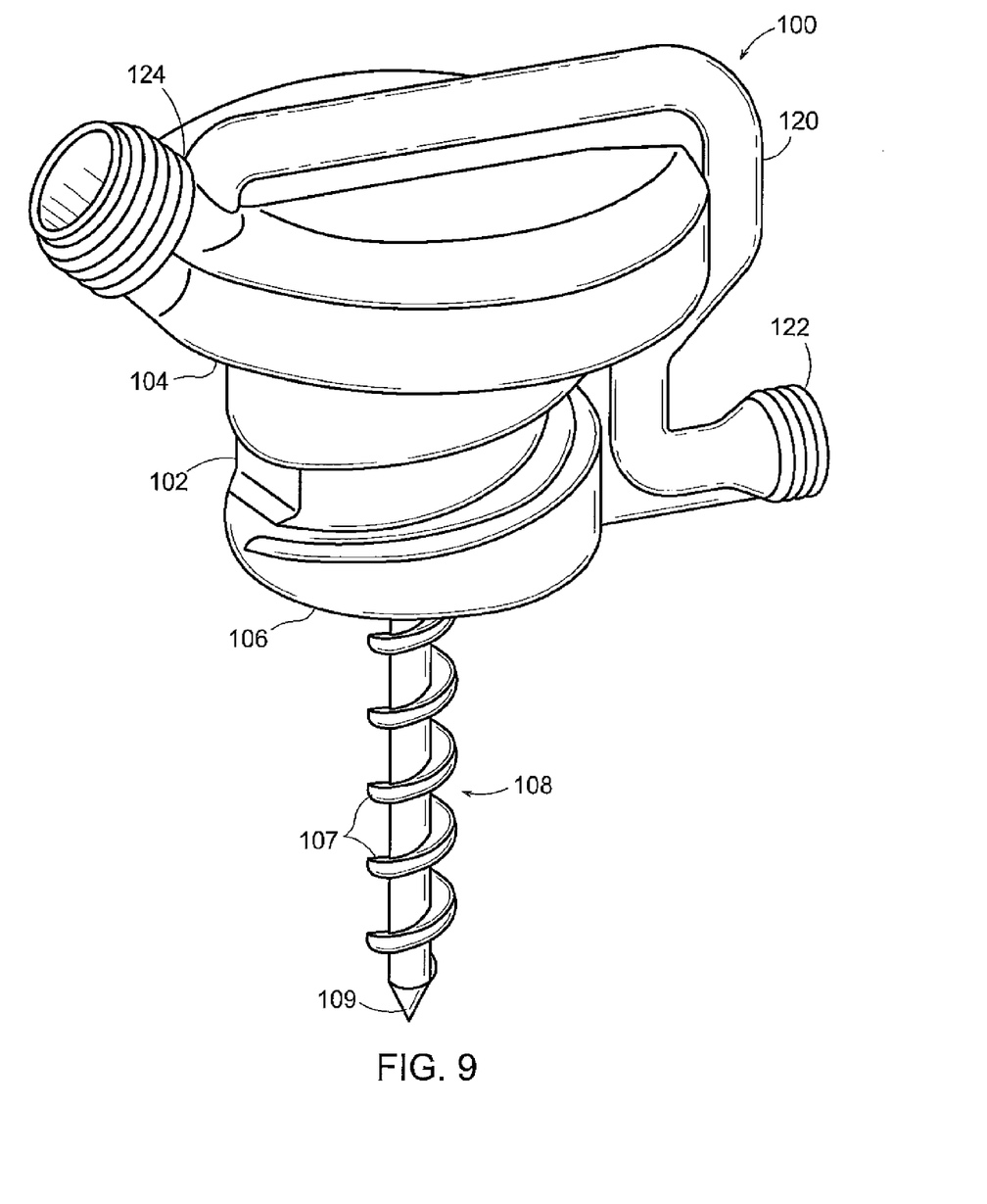
FIG. 9 is top perspective view of a refillable insect bait station in accordance with an alternate embodiment of the present invention.
Figure 10:
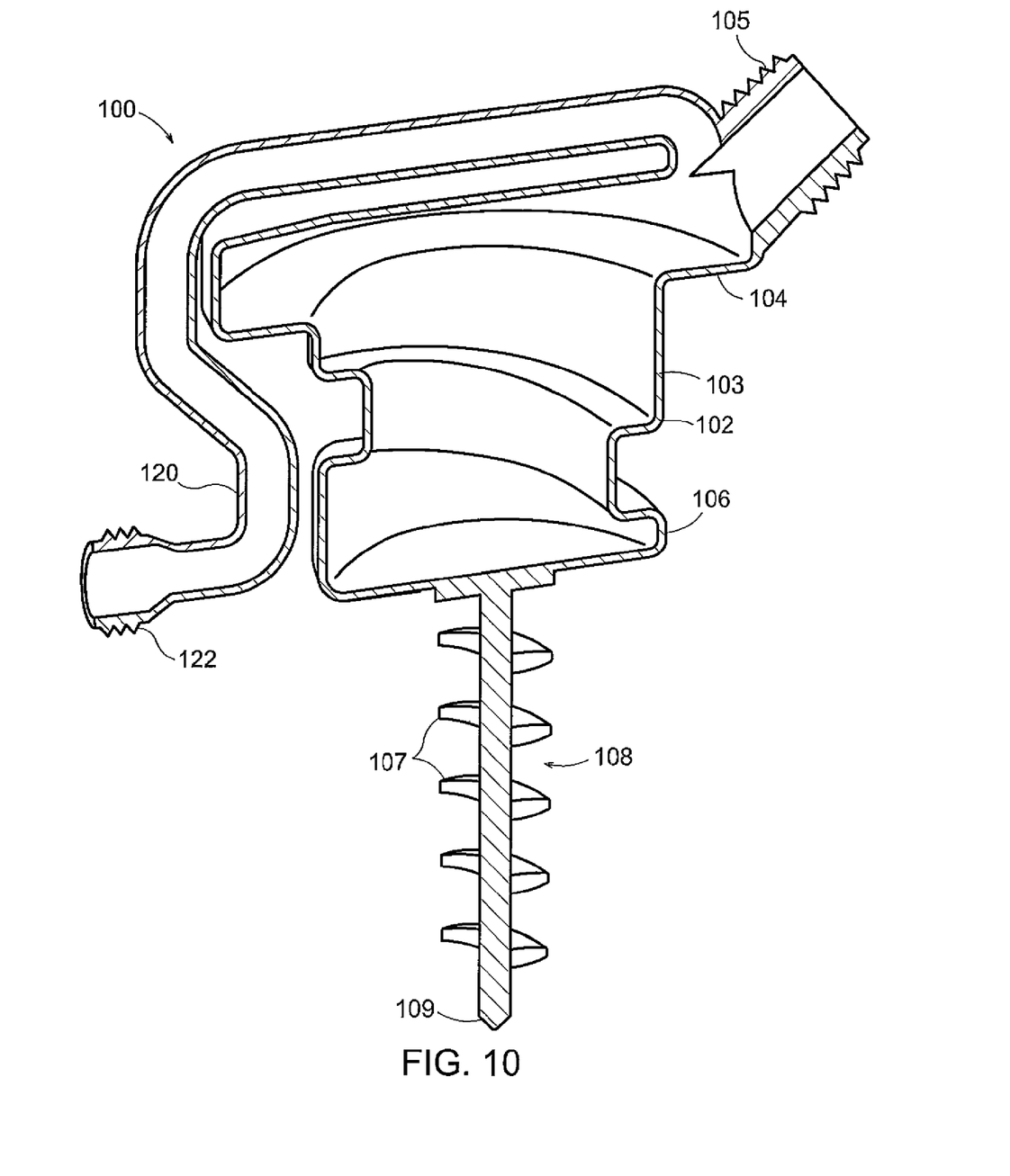
FIG. 10 is a sectional view thereof.

FIGS. 9 and 10 depict an alternate embodiment comprising a re-fillable insect bait station, generally referenced as 100. Bait station 100 includes a generally hollow main body 102 defining an internal reservoir for containing a flowable, preferably liquid, bait contained therein. Main body 102 includes a top portion 104 and a bottom portion 106. Main body 102 comprises a generally hollow body that functions as a bait reservoir for containing insect bait, such as a liquid combination of attractant and toxicant. Insect bait station 100 is preferably fabricated from plastic-type material using blow molding fabrication.

Unlike the first disclosed embodiment, bait station 100 is not pre-filled and sealed and is intended to be re-fillable and reusable as further discussed below. The design of bait station 100, however, is similar to the design of the first disclosed embodiment bait station 10 in that it is designed such that a flowable bait may be filled to a level within main body 102 that is approximately one-half of the total volume defined by main body 102 between top and bottom portions 104 and 106. As with the first disclosed embodiment, evaporative loss is minimized by having an insect tunnel 120 with an atmospheric exposed opening, namely inlet 122, disposed in a remote location relative to the interior bait reservoir defined by main body 102.

As with the first disclosed embodiment, a significant aspect of the re-fillable embodiment is to provide an insect bait station that is spill resistant. Accordingly, insect bait station 100 is adapted with a tubular insect guide, generally referenced as 120, that provides insects with access to the flowable bait contained within main body 102. Insect guide 120 includes an inlet opening 122 comprising an insect access entrance disposed on a first side of main body 102 in proximity to base 106, and an outlet 124 comprising an insect outlet disposed on a second side of main body 102 and coextensively with an opening in proximity to the top 106 of main body 102. First opening 122 preferably includes a male threaded end portion 123 for receiving a female threaded cap (not shown) that is removed by the user upon deployment. Placement of the inlet opening 122 of insect guide 120 in proximity to the base 106 on a first side of the bait station, with the guide outlet 124 in proximity to the top 104 on an opposing second side of the bait station functions to render the bait station inherently spill resistant as previously discussed. In addition, bait station 100 includes a filling port, generally referenced as 105, defined proximal top portion 104 to facilitate the addition of additional flowable bait material. Filling port 105 is preferably to adapted with male threads for mating engagement with a female threaded cap (not shown).

Bait station 100 further includes the inner wall of main body 102 adapted with a ramp structure, referenced as 103 as best depicted in the sectional view shown in FIG. 10, for providing insects with a traversable surface leading directly to liquid bait contained within bait station 100. Accordingly, after insects enter the interior of main body 102 at the top portion 104 upon exiting the outlet 124 of insect guide 120 the provision of an interior spiral ramp 103 provides the insects with a guide and path downward to the flowable bait, regardless of the fill level. Spiral ramp 103 preferably extends downward along the inner wall of main body 102 from top portion 104 to bottom portion 106, or substantially the entire length of main body 102 thereby insuring that insects may reach the bait contained therein regardless of the fill level.

Insect bait station 100 further includes a ground anchor 108 projecting from base 104 of main body 102 to facilitate anchoring the bait station to the ground. In a preferred embodiment, ground anchor 108 comprises an elongate projecting spike terminating in a pointed end 109, and having projecting threads 107 radially projecting therefrom. As should be apparent, ground anchor 108 functions to allow the user to securely anchor bait station 100 to the earth by rotating the bait station such that threads 107 function to draw the bait station into the ground. In an alternate embodiment ground anchor 108 may comprise a simple or complex spike, or other suitable ground anchor structure.

Bait station 100 is deployed for use by removing the cap covering inlet 22 and screwing bait station 100 into the ground until bottom portion 106, and more particularly, inlet opening 122 of insect guide 120 is generally disposed at ground level. Attracted by the attractant component of the bait contained within bait station 100, insects enter the ground level inlet opening 122 and make their way through insect guide 120 to terminus at outlet 124 coextensive with an opening at the top portion 104 of main body 102. Once inside bait station 100, the insects are able to traverse spiral ramp 103 down to the bait level whereby the insects are exposed to the toxicant portion of the bait. As noted above, ramp structure 103 further provides insects that have recently been exposed to the bait toxicant a means of egress out and away from the bait station, thereby preventing insects from falling into or drowning in the bait.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What I claim is:

1. A spill resistant insect bait station comprising:
   a generally hollow bait station body including a base, a top, and a side wall extending between said base and said top, said side wall having an exterior surface defining first and second bait station body lateral sides, said side wall having an inner surface, said body defining an internal bait reservoir;
   an insect guide tunnel, external to said body, for providing insects with access to said internal bait reservoir, said insect guide tunnel having a first end forming an opening disposed in the first lateral side of said bait station body in proximity to said base and a second end forming an opening disposed in the second lateral side of said bait station body in proximity to said top, said second end opening being in communication with said internal bait reservoir, said first lateral side being generally opposite said second lateral side;
   said tunnel first end having a removable cap;
   said side wall inner surface defining a helical ramp extending proximal said top to proximal said bottom thereby providing insects with a traversing surface; and
   means for anchoring said bait station body to the ground.

2. A spill resistant insect bait station according to claim 1, wherein said means for anchoring said bait station body to the ground comprises a ground anchor projecting from said base.

3. A spill resistant insect bait station according to claim 1, further including a fill port disposed in proximity to said top.

* * * * *